(12) United States Patent
Kim et al.

(10) Patent No.: US 10,885,071 B2
(45) Date of Patent: Jan. 5, 2021

(54) METHOD AND APPARATUS FOR CREATING LINK-TYPE GRID FINGERPRINT DATABASE

(71) Applicant: ELECTRONICS AND TELECOMMUNICATIONS RESEARCH INSTITUTE, Daejeon (KR)

(72) Inventors: Joo-Young Kim, Daejeon (KR); Myung-In Ji, Daejeon (KR); Ju-Il Jeon, Daejeon (KR); Young-Su Cho, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 673 days.

(21) Appl. No.: 15/154,280

(22) Filed: May 13, 2016

(65) Prior Publication Data

US 2017/0132248 A1    May 11, 2017

(30) Foreign Application Priority Data

Nov. 5, 2015    (KR) .................. 10-2015-0155302

(51) Int. Cl.
*G06F 16/29* (2019.01)
*G06F 16/21* (2019.01)
(Continued)

(52) U.S. Cl.
CPC .............. *G06F 16/29* (2019.01); *G06F 16/21* (2019.01); *H04W 4/029* (2018.02); *H04W 4/33* (2018.02)

(58) Field of Classification Search
CPC .................................. G06F 17/30241
See application file for complete search history.

(56) References Cited

U.S. PATENT DOCUMENTS 9,060,284 B2   6/2015  Cho et al.
9,476,717 B2 * 10/2016 Haverinen ........... G01C 21/206
(Continued)

FOREIGN PATENT DOCUMENTS

KR   10-2009-0059920 A   6/2009
KR   10-2011-0061767 A   6/2011
(Continued)

OTHER PUBLICATIONS

Tang et al., "Fast Fingerprint Database Maintenance for Indoor Positioning Based on UGV SLAM", Mar. 2015 (Year: 2015).*
(Continued)

*Primary Examiner* — Dawaune A Conyers
(74) *Attorney, Agent, or Firm* — LRK Patent Law Firm (57) ABSTRACT

An apparatus for creating a link-type grid fingerprint database includes a collected data processing unit for receiving positioning resource information collected from a link, which represents a path along which a pedestrian can move in an indoor space, and storing the positioning resource information in a collection DB, and a database creation unit for creating a link-type fingerprint database based on the positioning resource information and information about the link, stored in the collection DB, and storing the created link-type grid fingerprint database in a positioning DB.

7 Claims, 3 Drawing Sheets

(51) Int. Cl.
   *H04W 4/029* (2018.01)
   *H04W 4/33* (2018.01)

(56) References Cited

U.S. PATENT DOCUMENTS

| | | | |
|---|---|---|---|
| 2011/0128124 A1 | 6/2011 | Im | |
| 2013/0267258 A1 | 10/2013 | Yeo et al. | |
| 2013/0281111 A1* | 10/2013 | Syrjarinne | G01S 5/0252 455/456.1 |
| 2014/0228058 A1 | 8/2014 | Ji et al. | |
| 2014/0341198 A1* | 11/2014 | Han | H04W 64/00 370/338 |
| 2015/0341895 A1* | 11/2015 | Zhang | G01S 5/0252 455/456.1 |
| 2018/0007515 A1* | 1/2018 | Arslan | H04W 4/029 |

FOREIGN PATENT DOCUMENTS

| | | |
|---|---|---|
| KR | 10-2012-0005192 A | 1/2012 |
| KR | 10-1233841 B1 | 2/2013 |
| KR | 10-2013-0047386 A | 5/2013 |
| KR | 10-2014-0098283 A | 8/2014 |
| KR | 10-2015-0096761 A | 8/2015 |
| WO | 2009/072735 A1 | 6/2009 |
| WO | 2014/099972 A2 | 6/2014 |

OTHER PUBLICATIONS

Kim et al., "A Design of Irregular Grid Map for Large-Scale Wi-Fi LAN Fingerprint Positioning System", Sep. 2014 (Year: 2014).*
Mustika et al., "Reorganizing Fingerprint Informaiton Using Intersection Technique for RFID-based Indoor Localization System", 2014 (Year: 2014).*
Shin et al., "Wi-Fi Fingerprint-Based Topological Map Building for Indoor User Tracking", 2010 (Year: 2010).*
Paramvir Bahl et al., "RADAR: An In-Building RF-based User Location and Tracking System," INFOCOM, 2000, Nineteenth Annual Joint Conference of the IEEE Computer and Communications Societies, Proceedings, IEEE, 2000, pp. 775-784, vol. 2.

* cited by examiner

METHOD AND APPARATUS FOR CREATING LINK-TYPE GRID FINGERPRINT DATABASE

CROSS REFERENCE TO RELATED APPLICATION

This application claims the benefit of Korean Patent Application No. 10-2015-0155302, filed Nov. 5, 2015, which is hereby incorporated by reference in its entirety into this application.

BACKGROUND OF THE INVENTION

1. Technical Field

The present invention relates generally to a positioning system based on a fingerprint. More particularly, the present invention relates to a method and apparatus for creating a link-type grid fingerprint database by simplifying an indoor space into a connection network of links and collecting positioning resource information only from the links.

2. Description of the Related Art

Recently, with the rapid increase in the number of users of smart devices such as smart phones or tablets, a Location-based service (LBS), which provides convenience and optional services to the users, is attracting a lot of attention. Accordingly, a system for providing accurate location information in indoor environments, in which a Global Positioning System (GPS) may not be used, has been actively developed.

Among various methods for indoor positioning, a fingerprint method is less affected by the environment and has a relatively high degree of accuracy. (Refer to P. Bahl and V. N. Padmanabhan. "RADAR: an in-building RF-based user location and tracking system," in INFOCOM 2000. Nineteenth Annual Joint Conference of the IEEE Computer and Communications Societies. Proceedings. IEEE, 2000, pp. 775-784, vol. 2)

In the fingerprint method, positioning resource information for a service area has been collected in advance, and when a user who requests his or her location information acquires positioning resource information in the service area, the location of the user is estimated by comparing the pattern of the acquired information with that of the information collected in advance.

Figure 1:
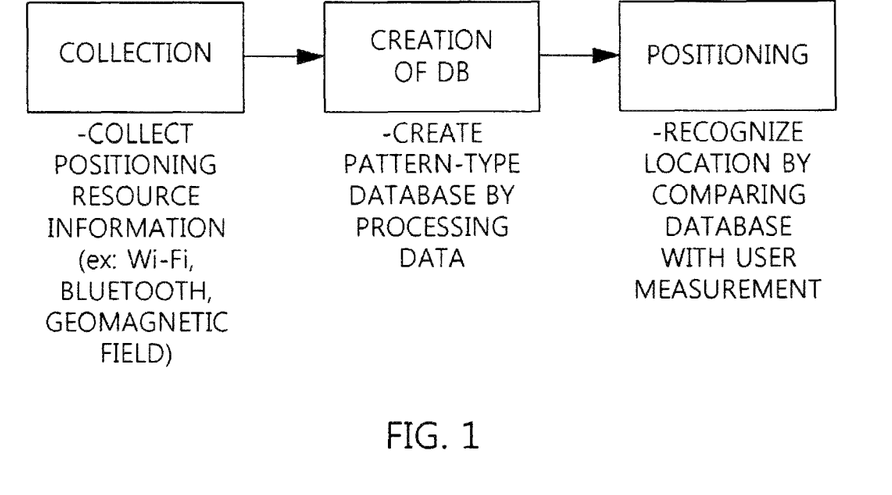
FIG. 1 illustrates the flow of a fingerprint-based indoor positioning method.

Specifically, as illustrated in FIG. 1, first, positioning resource information is collected from multiple points in an indoor space through a collection process, and a database of the collected information is created. A typical example of the collected positioning resources is the Received Signal Strength Indicator (RSSI) of a Wi-Fi signal, transmitted from multiple Access Points (APs) and received at each of the multiple points in the indoor space. The data collected from each of the multiple points may form a pattern that represents the positioning resource information at the corresponding point, and this pattern is called a fingerprint. After a database is created through such a process, the location of the user may be determined.

When the user who requests the location information acquires the positioning resource information in the service area (for example, the above-mentioned RSSI of multiple Wi-Fi signals, hereinafter, called 'user measurement'), the fingerprints stored in the database are compared with the acquired information, and the point having the pattern that is most similar to the information is estimated to be the location of the user. Among the above-mentioned processes, the process of collecting information and creating a database is called an offline phase, and the process of recognizing a location is called an online phase.

Due to the characteristic of the fingerprint method, which compares patterns, the location of a user can be precisely estimated only when an accurate database is provided. Therefore, it is essential to create a database that contains sufficient information through a suitable method. Generally, according to an existing method for creating a database, an indoor space is divided into sections in the form of a grid, positioning resource information is collected at the center point of each of the sections, and a database is created by processing the collected information. However, when this method is used, if the size of each of the sections formed by dividing the space is large, positioning resolution (granularity) decreases. Conversely, if the space is divided into smaller sections, it takes a lot of time and expense to create a DB from the collected information.

Additionally, when positioning is performed by comparing patterns, there may be a problem in which the result of positioning indicates jumping or bouncing. Generally, in an indoor space, a wireless channel environment is very complicated, and the characteristics thereof continually change due to various moving objects. This tendency becomes stronger when an indoor LBS is provided in a large building, an area having a complicated layout, or an area in which many people are moving around (for example, a service area such as a convention hall, an exhibition hall, an airport, a complex station, a large shopping center, or the like). Also, the user measurement continually changes because noise from a transmitter-receiver circuit or a sensor module is added thereto, thus the positioning result seems to be continually moving.

In other words, even when positioning is performed in the state in which an object remains stationary, the result continually changes, as if the object were bouncing. This arises from the complicated layout of an indoor space and the large number of moving objects. Therefore, this may occur not only when wireless positioning resources using Wi-Fi or Bluetooth are used but also when other positioning infrastructure using a geomagnetic field is used Particularly, when the existing method for creating a database is used, because areas having similar patterns are widely distributed in the 2-dimensional space, the positioning result jumps in every direction, and thus a user may feel that the quality of positioning significantly decreases.

DOCUMENTS OF RELATED ART (Patent Document 1) Korean Patent Application Publication No 10-2011-0061767.

SUMMARY OF THE INVENTION

Accordingly, the present invention has been devised to overcome the above-mentioned disadvantages, and an object of the present invention is to provide a method and apparatus for creating a link-type grid fingerprint database that may realize a lightweight database and improve positioning performance.

Another object of the present invention is to provide a method and apparatus for creating a link-type grid fingerprint database that may improve the accuracy of positioning by additionally providing link attribute information, which may be helpful in precise positioning, when creating a fingerprint-type database.

An apparatus for creating a link type grid fingerprint database according to an embodiment of the present invention may include a collected data processing unit for receiving positioning resource information, collected from a link that represents a path along which a pedestrian is capable of moving in an indoor space, and for storing the positioning resource information in a collection DB; and a database creation unit for creating a link-type grid fingerprint database based on the positioning resource information and information about the link, stored in the collection DB, and for storing the created link-type grid fingerprint database in a positioning DB.

According to an embodiment, the apparatus may further include a spatial information simplification device for forming an entire path into a connection network of links by simplifying the path along which the pedestrian is capable of moving into the link; and a collection device for collecting the positioning resource information at multiple points on each of the links that form the connection network.

According to an embodiment, the link-type grid fingerprint database may be configured with a combination of link-type grid fingerprints that are created by processing the positioning resource information grouped according to a representative point, which corresponds to a reference point of the link-type grid fingerprint database.

According to an embodiment, the database creation unit may further create an intersection fingerprint by processing positioning resource information on an intersection.

According to an embodiment, the positioning source information may include at least one of coordinates of a collection point on the link, a direction in which collection is performed on the link, a kind of a positioning resource collected at the coordinates of the collection point, a measurement of the positioning resource, and link attribute information of the coordinates of the collection point.

A method for creating a link-type grid fingerprint database according to an embodiment of the present invention may include receiving positioning resource information, collected from a link that represents a path along which a pedestrian is capable of moving in an indoor space, and storing the positioning resource information in a collection DB; creating a link-type grid fingerprint database based on the positioning resource information and information about the link, stored in the collection DB; and storing the created link-type grid fingerprint database in a positioning DB.

According to an embodiment, creating the link-type grid fingerprint database may comprise loading the positioning resource information collected from the link and the information about the link and classifying the loaded positioning resource information based on a link; creating a representative point for each link, the representative point corresponding to a reference point of the link-type grid fingerprint database; grouping positioning resource information adjacent to the representative point; creating a link-type grid fingerprint by processing the positioning resource information grouped according to the representative point; and creating the link-type grid fingerprint database based on the created link-type grid fingerprints.

According to an embodiment, the method may further include creating an intersection fingerprint by processing positioning resource information on an intersection.

According to an embodiment, the positioning source information may include at least one of coordinates of a collection point on the link, a direction in which collection is performed on the link, a kind of a positioning resource collected at the coordinates of the collection point, a measurement of the positioning resource, and link attribute information of the coordinates of the collection point.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below.

The present invention relates to an apparatus for creating a link-type grid database based on positioning resource information collected only from links of a network on a map, which is configured in such a way that an indoor space is simplified into paths along which a pedestrian can move, when constructing an indoor positioning platform for providing a location-based service based on a fingerprint method. Moreover, including link information in the database when the database is created and using the link information as supplementary information for positioning are also included in the scope of the present invention.

Figure 2:
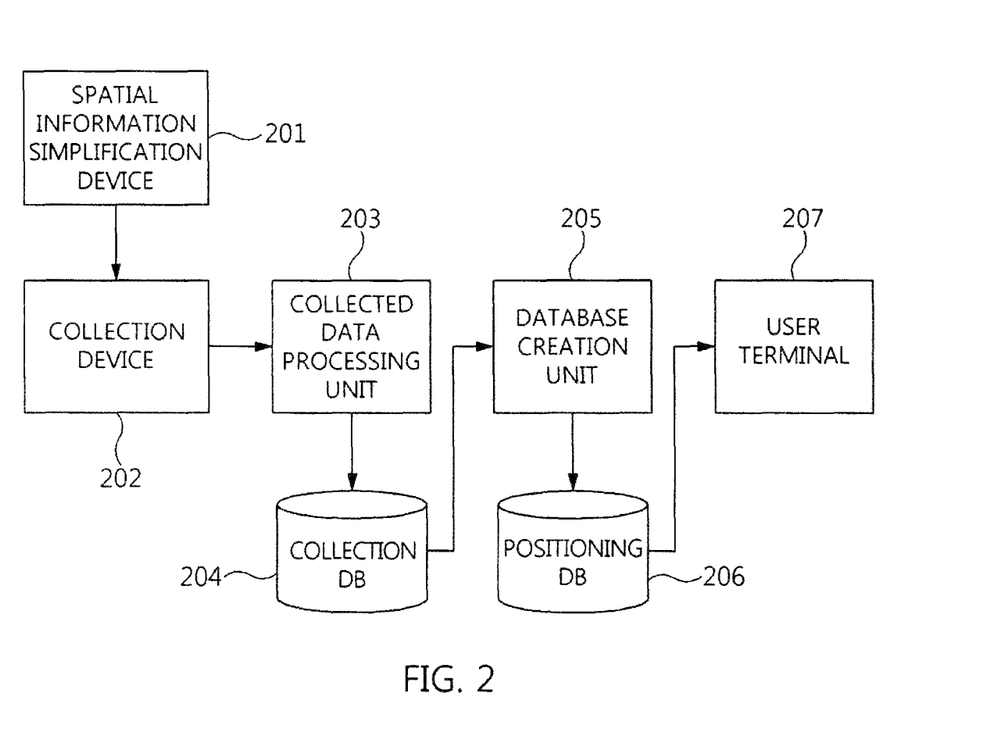
FIG. 2 is a block diagram of an apparatus for creating a link-type grid fingerprint database according to an embodiment of the present invention.

FIG. 2 illustrates a block diagram of an apparatus for creating a link-type grid fingerprint database according to an embodiment of the present invention.

The apparatus for creating a link-type grid fingerprint database according to an embodiment of the present invention includes a collected data processing unit 203 for receiving positioning resource information collected from a link that represents a path along which a pedestrian can move in an indoor space and storing the positioning resource information in a collection DB 204, a database creation unit 205 for creating a link-type grid fingerprint database based on the positioning resource information and information about the link, stored in the collection DB 204, and storing the created link-type grid fingerprint database in a positioning DB 206, and the positioning DB 206.

As illustrated in FIG. 2, other than the above components, an apparatus for creating a link-type grid fingerprint database according to another embodiment of the present invention may further include a spatial information simplification device 201 for reconstructing indoor space information into a connection network of the links by simplifying the indoor space information into the links, which are paths along which a pedestrian can move, and a collection device 202 for collecting the positioning resource information from each of the links, which form the connection network thereof. Additionally, a user terminal 207, illustrated in FIG. 2, is used to determine the location of a user by receiving positioning information from the positioning DB 206.

Hereinafter, each of the above-mentioned components of the apparatus for creating a link-type grid fingerprint database will be described in detail.

First, the spatial information simplification device 201 simplifies information about an indoor space into a connection network of links by checking the indoor space information and by simplifying a path, along which a pedestrian can move, into the link. Here, attribute information (which may be called link or node attribute information) may be assigned to each of the links and nodes, wherein the nodes are the start and end points of each of the links.

Figure 3:
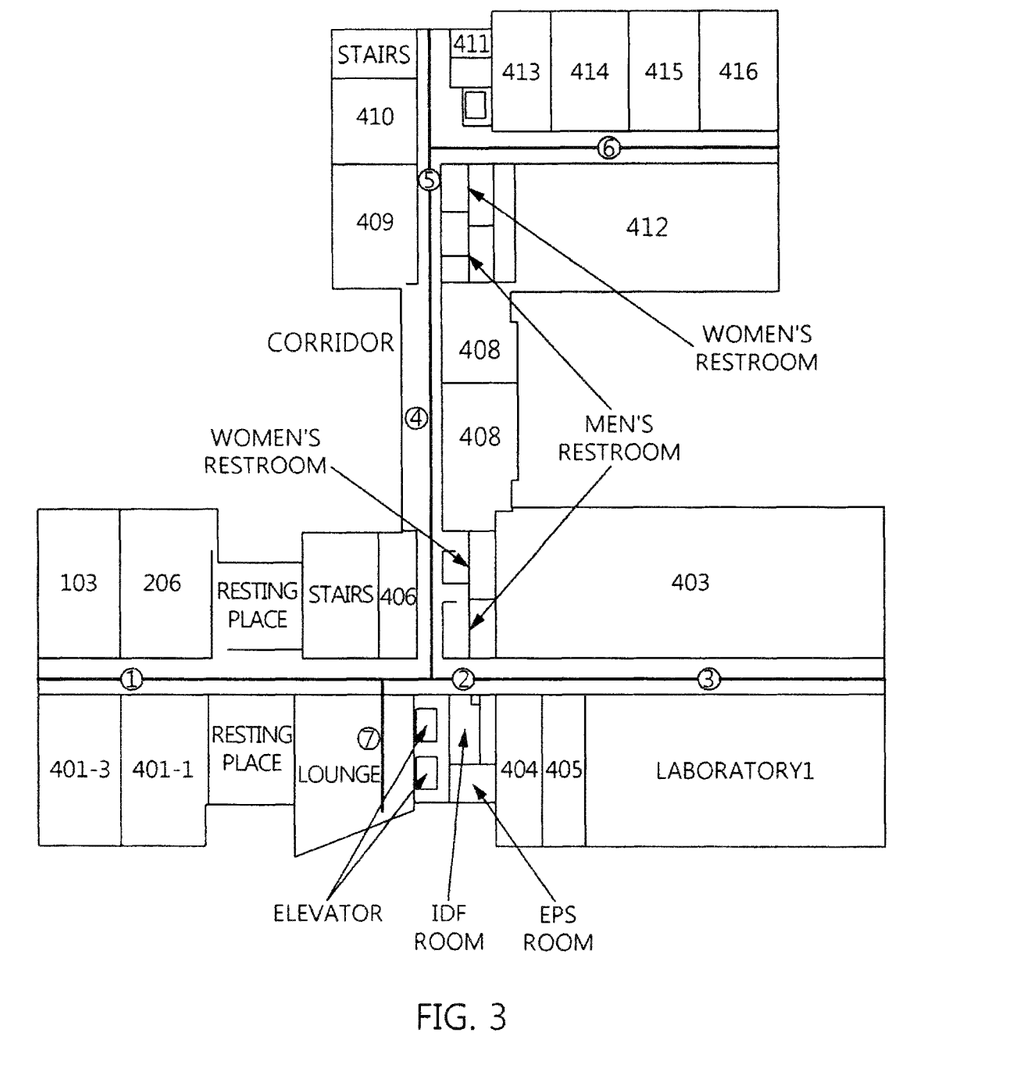
FIG. 3 illustrates an example for explaining the process of simplifying spatial information according to an embodiment of the present invention.

Link or node attribute information includes the ID of a link or a node, the direction of the link on a map, and information about the link connected to a node (when links intersect, information about multiple links may be included). Also, a specific direction on a link, which is the segment of a line on the link connection network, is set as a forward direction, and information about the direction may be stored. FIG. 3 shows an example in which actual spatial information is simplified based on this.

FIG. 3 illustrates a view for explaining the process of simplifying spatial information according to an embodiment of the present invention.

Referring to FIG. 3, a network A in the form of connected links, in which a corridor along which a pedestrian can walk in a building is marked as a solid line, has been created. Also, because link attribute information 1, 2, 3, 4, 5, and 6, which are the IDs of the links, are written on the links of the created network, the links are identified using these IDs. Meanwhile, as an embodiment for improving collection efficiency, the paths may be set to include areas in which a pedestrian frequently moves and to exclude restricted areas that ordinary pedestrians are not permitted to access, when designing the paths.

The collection device 202 is a device for collecting various pieces of positioning resource information from at least one point on each of the links, which are simplified from the paths along which a pedestrian can move in the indoor space. The positioning resource information collected by the collection device 202 may include the coordinates of a point on the link, at which information is collected, the direction in which collection is performed on the link, the kind of positioning resources collected at the corresponding coordinates, and measurements of the positioning resources (the reception sensitivity of various devices capable of wireless communication such as Wi-Fi, Bluetooth, LTE, WiMAX, and the like, a geomagnetic field, and atmospheric pressure), but the positioning resource information is not limited to these. Also the positioning resource information may include attribute information about the link that includes the coordinates, and the attribute information may be used as supplementary information when creating a database.

As in the description of the spatial information simplification device 201, when a specific direction on a link is set as a forward direction and the direction opposite thereto is set as a backward direction, the direction in which collection is performed on the link includes an embodiment for determining whether the direction a collector faces is a forward direction or a backward direction when the collector collects the information. Alternatively, when the azimuth angle of the orientation of a user is measured based on the direction indicated by the link using a compass of the collection device 202, checking whether the orientation on the link is a forward direction or a backward direction based on the measurement and storing the corresponding information may be included in the embodiment.

The collected data processing unit 203 serves to receive the positioning resource information, collected from at least one point on each of the links forming the link connection network, from the collection device 202, to process the information if necessary, and to store it in the collection DB 204. To this end, the collected data processing unit 203 may include a collection device connection/communication module, a collected data processing module, and a collection DB connection/communication module.

The collection DB 204 stores the positioning resource information, received from the collected data processing unit 203, in the form of a database. The collection DB 204 may be a separate device, or may be included in the device that includes the collected data processing unit 203.

The database creation unit 205 creates a link-type grid database by periodically loading the positioning resource information and information about the link from the collection DB 204 and stores the created database in the positioning DB 206. The database includes the coordinates of a representative point, the direction of the collected data used for creating the database, the kind of positioning resource collected at the corresponding coordinates (the coordinates of the representative point), the measurement of the corresponding positioning resource, and the attribute information about the link in which the corresponding coordinates (the coordinates of the representative point) are included. The measurement of the positioning resource may include the reception sensitivity of a wireless communication device, a geomagnetic field, or atmospheric pressure, which has been included in the collected information.

Also, according to a positioning method, the variation in the measurement of the positioning resource may be stored, rather than the absolute value thereof. For example, when a database is created using a Wi-Fi reception sensitivity measurement, the variation in the reception sensitivity, transmitted from each AP, may be input to the database, rather than the absolute value thereof. When the variation is represented as a numerical value, statistics such as variance and standard deviation may be used.

The positioning DB 206 stores the link-type grid database, created by the database creation unit 205. The positioning DB 206 may be a separate device, or may be included in the device that includes the database creation unit 205.

The user terminal 207 is a terminal that is used in order for a user to be provided with a location-based service. When the user enters a service area and starts tracking his or her location in order to be provided with the location-based service, the terminal acquires the positioning resource information, compares it with the link-type grid database stored in the positioning DB 206, and estimates the location of the user as the point corresponding to the location of data that are most similar to the positioning resource information. Here, the user terminal 207 may receive the positioning DB 206 via a wired or wireless network when tracking a location is started, or the positioning DB 206 may be stored in advance in the user terminal 207 and then used.

Hereinafter, the operation of the database creation unit 205, that is, the method for creating a link-type grid fingerprint database, will be described in detail with reference to FIG. 4.

Figure 4:
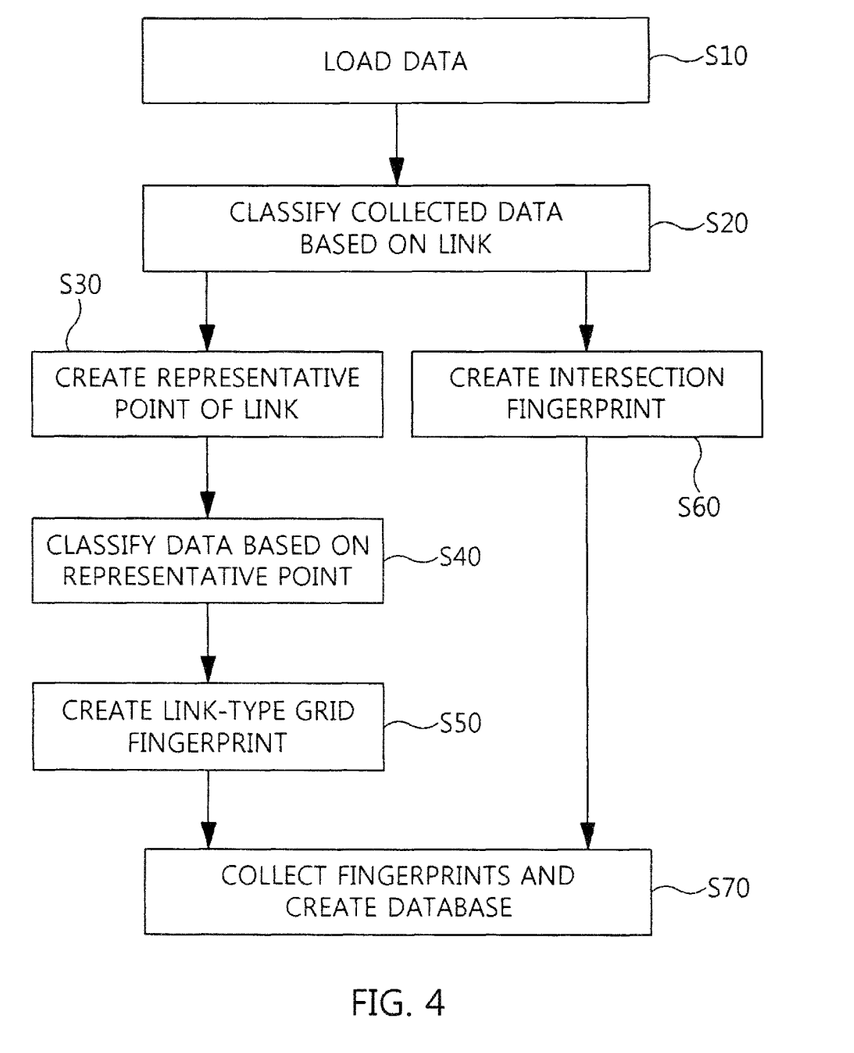
FIG. 4 illustrates the flow of the process of creating a link-type grid fingerprint database according to an embodiment of the present invention.

FIG. 4 is a flowchart of the process of creating a link-type grid fingerprint database according to an embodiment of the present invention.

Referring to FIG. 4, first, the database creation unit 205 loads collected data from the collection DB 204 all at once or periodically, at step S10 (data loading step). Here, the data are positioning resource information and information about links, stored in the collection DB 204. Meanwhile, the interval at which data are loaded may vary depending on the characteristics of the service. Here, in order to load only suitable data, the collection DB 204 may include a function for loading only data that satisfy a specific condition. The specific condition may include the time at which data are collected, the place in which data are collected, a specific region inside the place in which data are collected (i.e., coordinates or a floor), the kind of terminal, and the like.

When data are loaded, the database creation unit 205 classifies the collected data based on a link at step S20 (a step of classifying collected data based on a link). Specifically, in the step of classifying the collected data based on a link, the link attribute information, included in the collected data or the coordinates at which the data are collected, is checked, and thereby a link from which each of the data is collected is determined. Then, data collected from different links are separated from each other. Here, if an intersection is separately processed, data located near the intersection are separated from the data classified based on a link.

When the collected data are classified based on a link, the database creation unit 205 creates a representative point on a link at step S30. That is, representative points that correspond to the reference points of a fingerprint database are created for the link on which the collected data are located. The representative points may be points equally distant from each other on the link, or the distance between the points may differ depending on the density of the point at which data are collected.

Then, the database creation unit 205 classifies the data based on a representative point at step S40. In the step of classifying the data based on a representative point, in order to create a fingerprint for each of the representative points by processing the collected data, the data collected near each representative point are grouped.

In order to create a link-type grid fingerprint at step S50, the database creation unit 205 processes the collected data, which are grouped based on a representative point. Here, because a fingerprint is created for the representative point located on the link as if a fingerprint database were created by forming a grid, it is called a link-type grid fingerprint. The method for creating a fingerprint includes an embodiment in which the mean of the measurements is computed for each of the positioning resources, but the method is not limited to this. For example, when 3-axis geomagnetic field information is collected, the mean of the data collected for each axis is calculated, and a fingerprint that represents the measurement for each axis may be created. Alternatively, after the norm of each of the collected data (the 3-axis geometric field) is taken, a fingerprint may be created by calculating the mean of the data.

Also, when a fingerprint is created, link attribute information, which may be helpful in improving the positioning accuracy by being used as supplementary information in positioning, may be included. The link attribute information may include a unique link identifier (for example, the identifier of each link, illustrated in FIG. 3), the direction of a link, and the like.

Meanwhile, in order to create an intersection fingerprint at step S60, the database creation unit 205 processes data collected on the intersection, which have been separately classified in the step of classifying the collected data based on a link (S20), and thereby creates the intersection fingerprint. The intersection fingerprint includes the same information as that included in the fingerprint of the link. However, when link attribute information is also included in the fingerprint, as in the above-mentioned embodiment, a unique link identifier for representing an intersection and at least two pieces of link direction information are included. This is because the intersection is generated at a point at which at least two links meet.

Then, in the step of collecting fingerprints and creating a database (S70), the database creation unit 205 creates a database by collecting all of the fingerprints, created at the intersection and multiple representative points on the links, and transmits the created database to the positioning DB 206. Here, creating the database by collecting the fingerprints may comprise correcting the fingerprints using data generated at adjacent points and collecting the corrected fingerprints, rather than merely collecting the fingerprints.

When a link-type grid fingerprint database is created through the above-described processes, the time and expense for collecting the positioning resource information may be minimized. In other words, because the points at which data are collected, which are originally located in the regions representing divisions of a wide-ranging service area, are limited to the paths along which users of the service or pedestrians frequently move, the data collection range is scaled down from collection on two-dimensional surfaces to collection along one-dimensional lines.

Also, because the present invention designs paths in consideration of accessibility to and density of pedestrians, it is possible to select only meaningful data to be collected, so that collection efficiency may be significantly increased. Also, the time and expense taken to collect data may be greatly reduced, whereby the efficiency with which a database is created may be increased.

Additionally, a method for calculating the location of a user using the created link-type grid fingerprint database will be described below.

First, in order to improve positioning performance when calculating the location of a user, both the previous positioning result and link attribute information provided from the positioning DB 206 may be used. To this end, an embodiment may include an estimated location correction method that comprises a step of estimating a current location, a step of comparing link attribute information of the estimated current location with that of a previously estimated location, and a step of correcting the estimated current location.

In order to describe the embodiment in detail, it is assumed that at least one positioning result is on a specific link. In this situation, if a user acquires incorrect positioning resource information due to an unexpected change in the environment, and thus the estimated current location is on a link that is far away from the link in which the previously estimated location is included, the estimated current location may be corrected by the above-mentioned embodiment, or the previously estimated location may be continuously used by excluding the estimated current location.

As another embodiment of a positioning method using link attribute information, there may be a method in which a sensor-based positioning system corrects direction information using the link attribute information. The sensor-based positioning system, which updates the relative displacement of a user using a single sensor or multiple sensors, may correct the orientation of the user using the link attribute information. In other words, when a user is assumed to move forward a specific distance at a specific angle based on the result of positioning, if the actual direction of the corresponding link is different from the estimated direction as the result of checking the link attribute information, the location of the user may be correctly updated using such information.

If the correction process is skipped and error is accumulated when estimating the direction, the location of a user may deviate from the paths in the indoor space, but such error may be corrected through the above-mentioned embodiment. In other words, by performing the correction of the direction information, it is possible to prevent incorrect estimation, for example, that a user who is walking along a corridor suddenly climbs over a wall in the corridor and enters a room. Accordingly, a preferred embodiment may include a step of estimating location information, a step of checking link attribute information, and a step of correcting the estimated current location.

In consideration of the above-described method for calculating the location of a user, the location estimated by the present invention is also on paths, and thus a user may feel that the positioning quality is improved. In other words, the estimated location, shown as if bouncing due to a change in an environment or noise from a circuit, may be limited to points on a link.

Also, positioning performance may be improved using link information when positioning is performed. According to the two above-described embodiments, a sudden change of location is excluded or corrected by checking the link on which the previous positioning result exists, whereby a temporary location may be corrected. Also, when sensor-based Pedestrian Dead Reckoning (PDR) is used, the direction in which a user is moving may be corrected using the link direction information, whereby the positioning accuracy is increased. Additionally, an erroneously estimated location, such as one indicating that a user passes through a wall or climbs over an obstruction because the location of a user is incorrectly updated, may be prevented. Therefore, a correct positioning result may be acquired.

As described above, the present invention limits points at which positioning resource information is collected to paths in an indoor space along which the users of a service or pedestrians frequently move, whereby a data collection range is scaled down from collection on two-dimensional surfaces to collection along one-dimensional lines. That is, thanks to the design of the paths in consideration of the accessibility to and density of pedestrians, only meaningful data may be selected and collected. Therefore, the collection efficiency may be increased, the expense and time incurred in collecting the information may be reduced, and the efficiency with which a database is created may also be increased.

Also, according to the present invention, because an estimated location is along a user's path, a user may feel that the positioning quality is improved. In other words, even if the positioning result is shown as though it were bouncing, which may be caused by changes in an environment or noise from circuits, the result may be limited to points along a link. Also positioning performance may be improved by using information about the link.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for creating a link-type grid fingerprint database, comprising:

a spatial information simplification device for simplifying information about an indoor space into a connection network of links, wherein the links represent paths along which a pedestrian is capable of moving within the indoor space;

a collection device for collecting positioning resource information at multiple points on each of the links, wherein the positioning resource information comprises at least a direction in which each collection is performed;

a collected data processing unit for receiving the positioning resource information, collected at the multiple points by the collection device, and for storing the positioning resource information in a collection DB; and a database creation unit for creating the link-type grid fingerprint database based on the positioning resource information and information about the links, stored in the collection DB, and for storing the created link-type grid fingerprint database in a positioning DB, wherein the link-type grid fingerprint database is configured with a combination of link-type grid fingerprints that are created by processing the positioning resource information grouped according to a representative point, which corresponds to a reference point of the link-type grid fingerprint database, and wherein the link-type grid fingerprint database stored in the positioning DB is used to estimate a location of a user as a point corresponding to a location of data most similar to the positioning resource information acquired by a terminal of the user.

2. The apparatus of claim 1, wherein the positioning resource information further comprises at least one of coordinates of a collection point on a link, a kind of a positioning resource collected at the coordinates of the collection point, a measurement of the positioning resource, and link attribute information of the coordinates of the collection point.

3. The apparatus of claim 1, wherein:

the positioning resource information collected from the links and the information about the links are loaded and the loaded positioning resource information is classified based on a link;

a representative point for each link is created, the representative point corresponding to a reference point of the link-type grid fingerprint database;

positioning resource information adjacent to the representative point is grouped together so that data collected near each representation point are grouped together;

a link-type grid fingerprint is created by processing the positioning resource information grouped according to the representative point; and the link-type grid fingerprint database is created based on the created link-type grid fingerprints.

4. A method for creating a link-type grid fingerprint database, comprising:

simplifying information about an indoor space into a connection network of links, wherein the links represent paths along which a pedestrian is capable of moving within the indoor space;

collecting positioning resource information at multiple points on each of the links, wherein the positioning resource information comprises at least a direction in which each collection is performed;

receiving the positioning resource information, collected at the multiple points, and storing the positioning resource information in a collection DB;

creating the link-type grid fingerprint database comprises:
loading the positioning resource information collected from the links and the information about the links and classifying the loaded positioning resource information based on a link;
creating a representative point for each link, the representative point corresponding to a reference point of the link-type grid fingerprint database;
grouping positioning resource information adjacent to the representative point so that data collected near each representative point are grouped together;
creating a link-type grid fingerprint by processing the positioning resource information grouped according to the representative point; and
creating the link-type grid fingerprint database based on the created link-type grid fingerprints,
storing the created link-type grid fingerprint database in a positioning DB, and
wherein the link-type grid fingerprint database stored in the positioning DB is used to estimate a location of a user as a point corresponding to a location of the data most similar to the positioning resource information acquired by a terminal of the user.

5. The method of claim 4, wherein the positioning resource information further comprises at least one of coordinates of a collection point on the link, a kind of a positioning resource collected at the coordinates of the collection point, a measurement of the positioning resource, and link attribute information of the coordinates of the collection point.

6. The method of claim 4, wherein the creating the link-type grid fingerprint database comprises creating an intersection fingerprint by processing the positioning resource information of a link corresponding to an intersection, wherein the intersection fingerprint comprises a link unique identifier that indicates the link corresponds to the intersection, and at least two directions in which collection is performed on the intersection.

7. An apparatus for creating a link-type grid fingerprint database, comprising:
a spatial information simplification device for simplifying information about an indoor space into a connection network of links, wherein the links represent paths along which a pedestrian is capable of moving within the indoor space;
a collection device for collecting positioning resource information at multiple points on each of the links, wherein the positioning resource information comprises at least a direction in which each collection is performed;
a collected data processing unit for receiving the positioning resource information, collected at the multiple points by the collection device, and for storing the positioning resource information in a collection DB; and
a database creation unit for creating the link-type grid fingerprint database based on the positioning resource information and information about the links, stored in the collection DB, and for storing the created link-type grid fingerprint database in a positioning DB,
wherein the database creation unit further creates an intersection fingerprint by processing the positioning resource information of a link corresponding to an intersection, wherein the intersection fingerprint comprises a link unique identifier that indicates the link corresponds to the intersection, and at least two directions in which collection is performed on the intersection, and
wherein the link-type grid fingerprint database stored in the positioning DB is used to estimate a location of a user as a point corresponding to a location of data most similar to the positioning resource information acquired by a terminal of the user.

* * * * *